Figure 5:
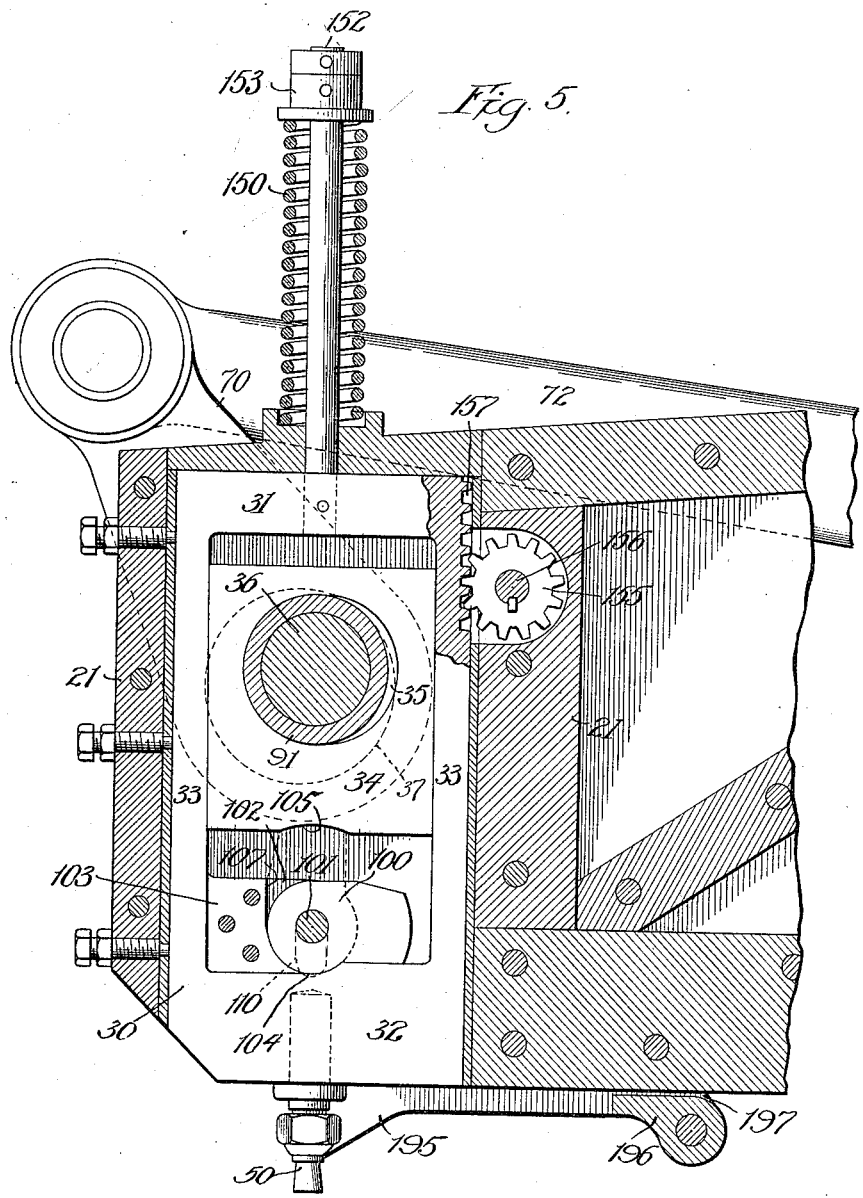

H. B. KRAUT.
COMBINED PUNCHING, SHEARING, AND BAR CUTTING MACHINE.
APPLICATION FILED JUNE 8, 1910.
1,006,761.
Patented Oct. 24, 1911.
7 SHEETS—SHEET 1.
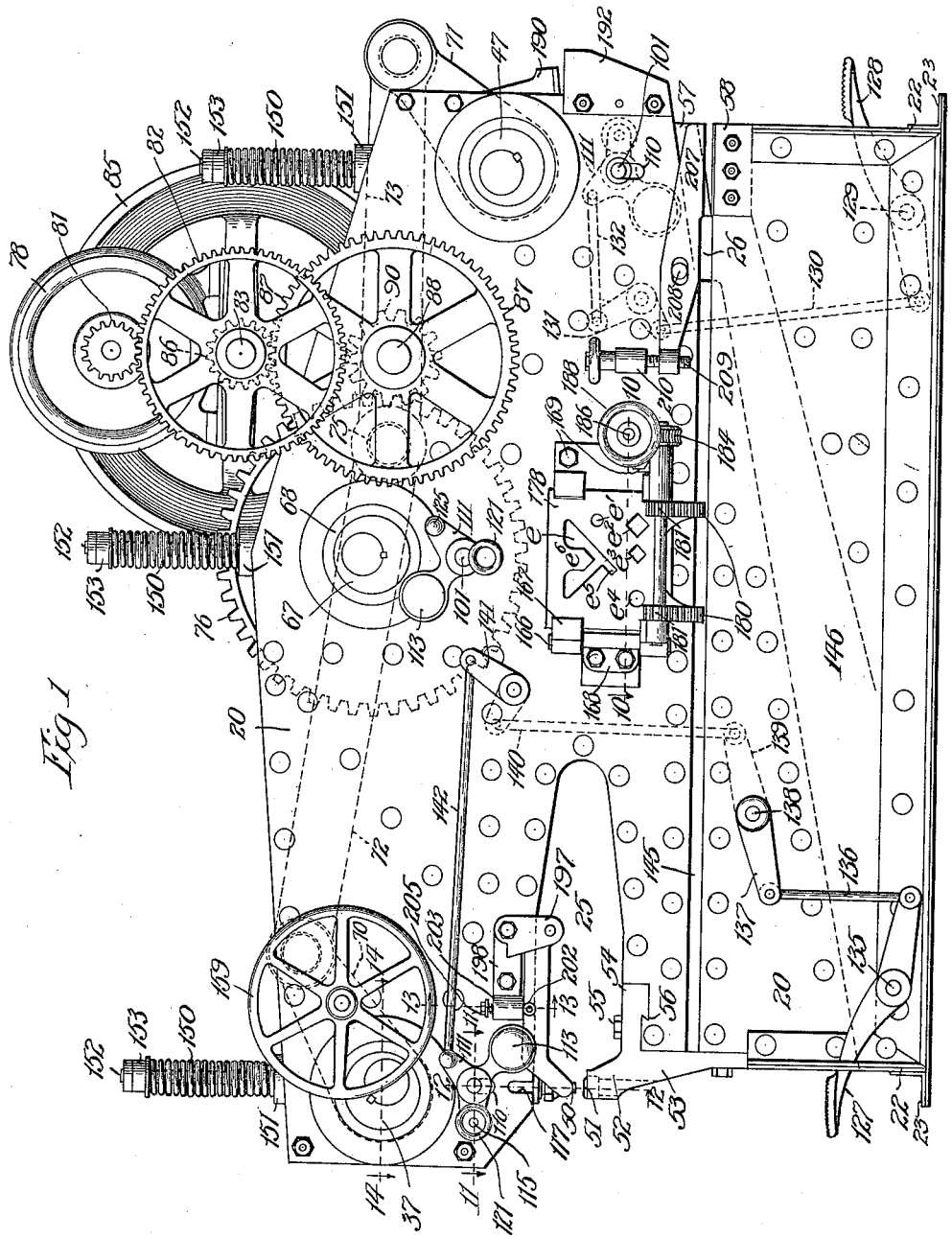

H. B. KRAUT.
COMBINED PUNCHING, SHEARING, AND BAR CUTTING MACHINE.
APPLICATION FILED JUNE 8, 1910.
1,006,761.
Patented Oct. 24, 1911.
7 SHEETS—SHEET 2.
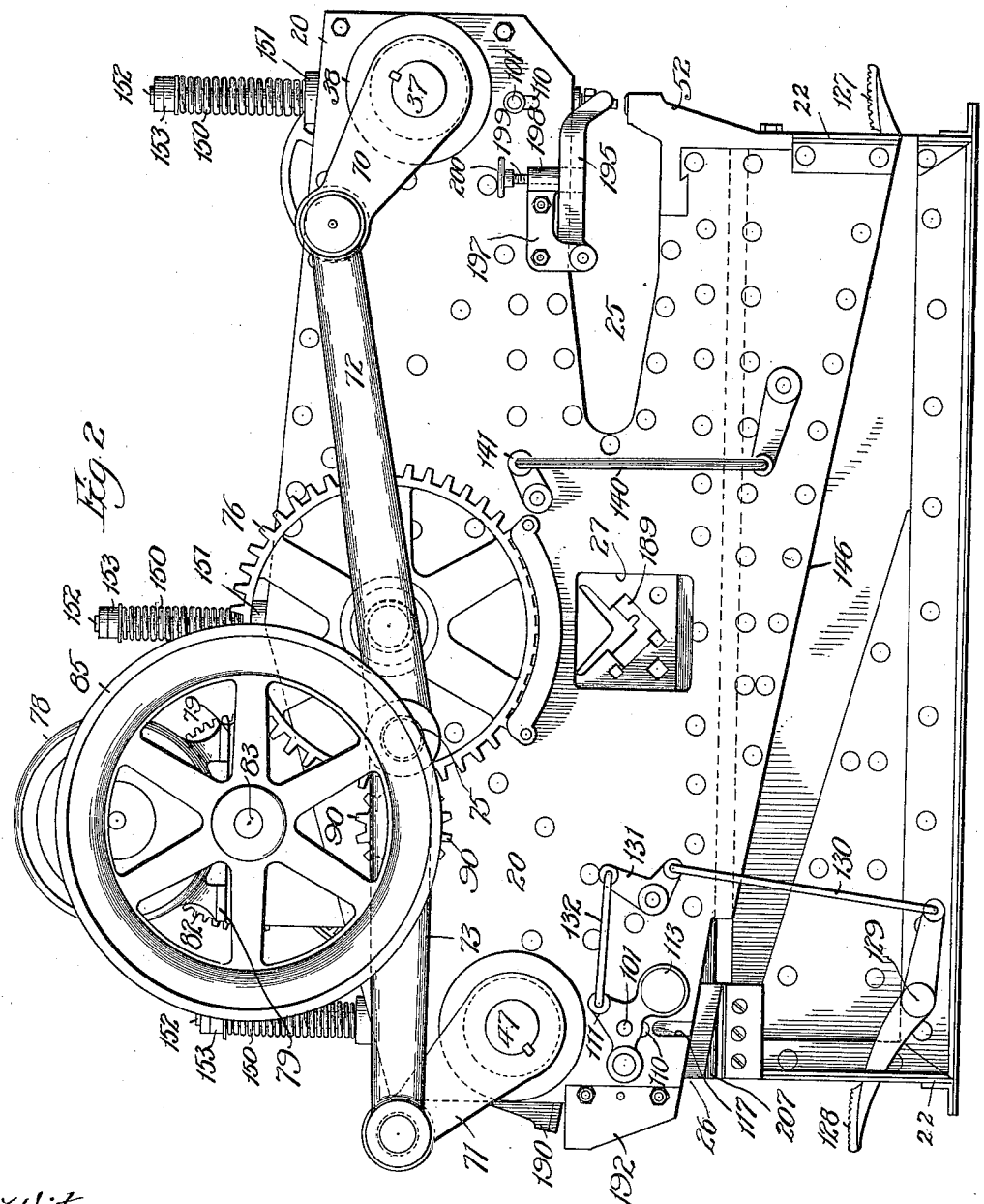

H. B. KRAUT.
COMBINED PUNCHING, SHEARING, AND BAR CUTTING MACHINE.
APPLICATION FILED JUNE 8, 1910.
1,006,761.
Patented Oct. 24, 1911.
7 SHEETS—SHEET 3.
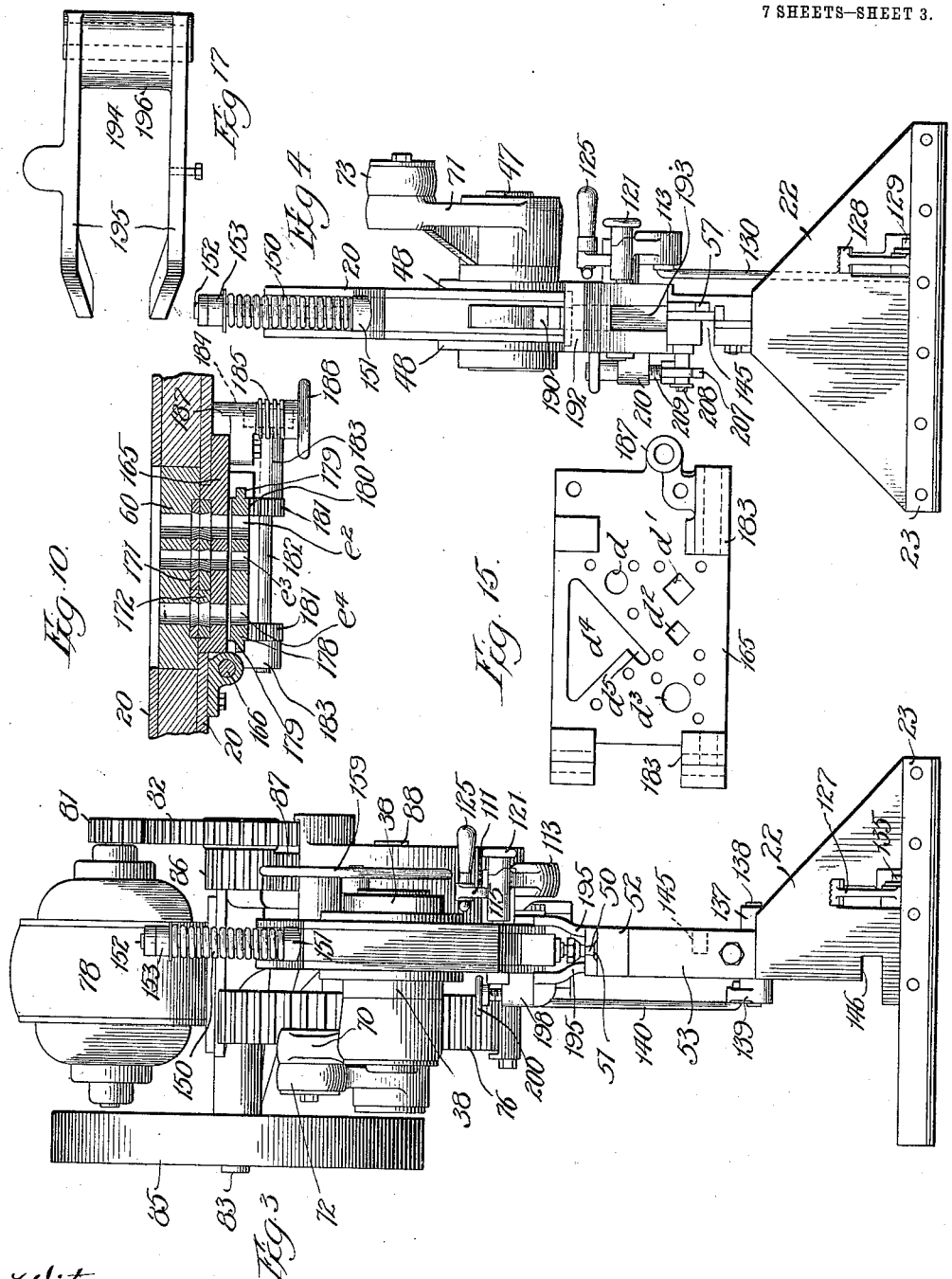

H. B. KRAUT.
COMBINED PUNCHING, SHEARING, AND BAR CUTTING MACHINE.
APPLICATION FILED JUNE 8, 1910.

1,006,761.

Patented Oct. 24, 1911.
7 SHEETS—SHEET 4.

H. B. KRAUT.
COMBINED PUNCHING, SHEARING, AND BAR CUTTING MACHINE.
APPLICATION FILED JUNE 8, 1910.
1,006,761. Patented Oct. 24, 1911.
7 SHEETS—SHEET 5.
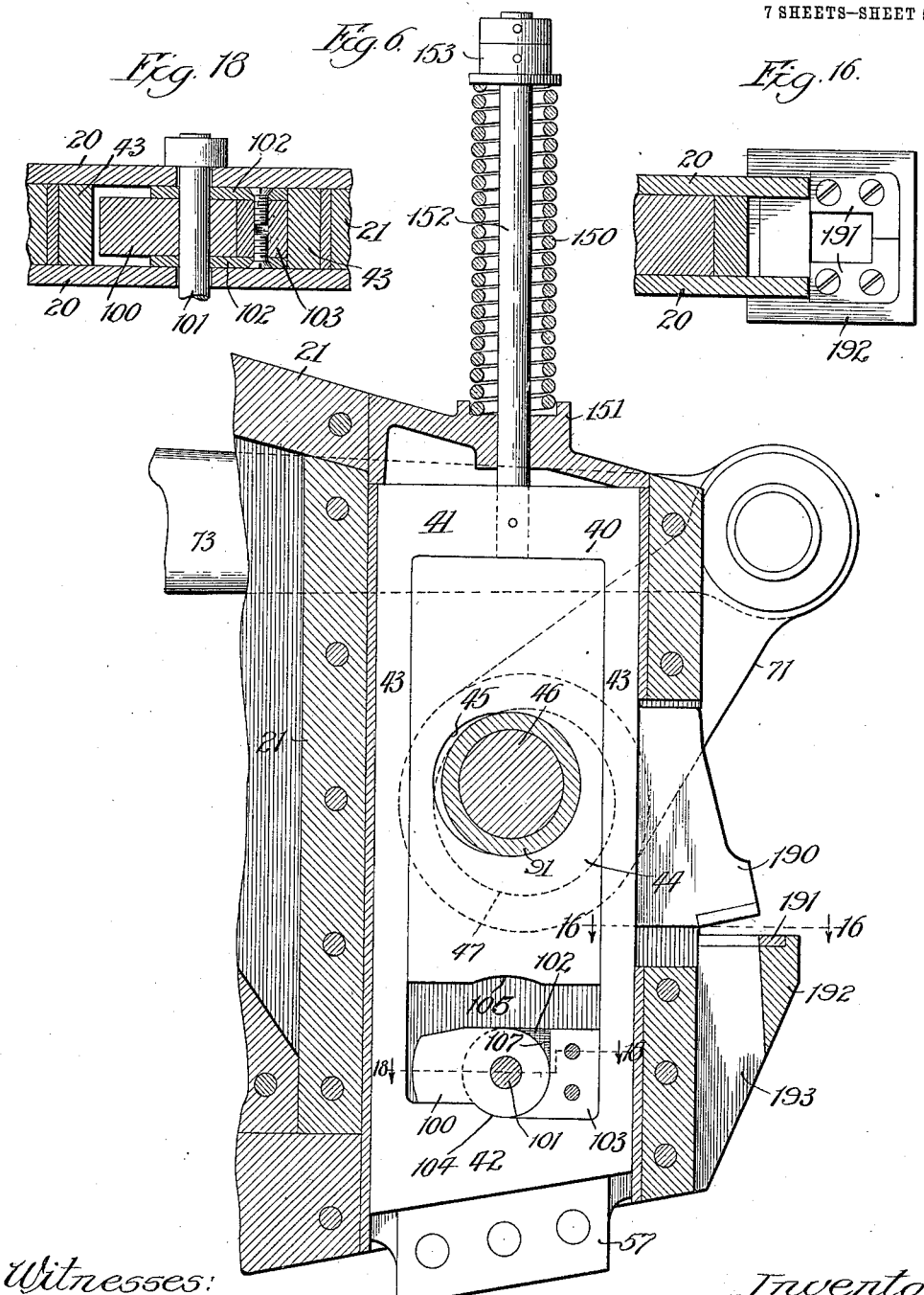

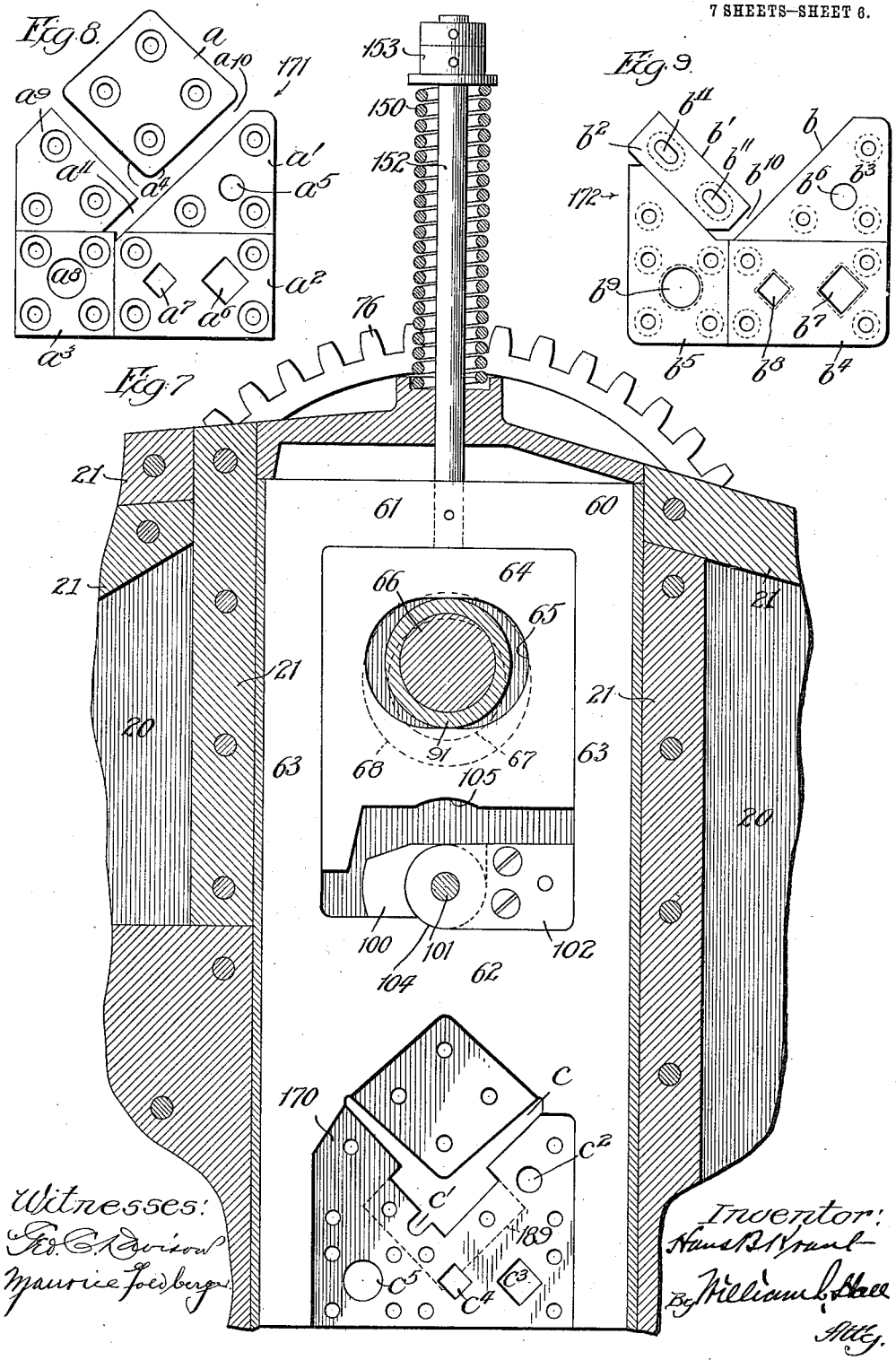
H. B. KRAUT.
COMBINED PUNCHING, SHEARING, AND BAR CUTTING MACHINE.
APPLICATION FILED JUNE 8, 1910.
1,006,761.    Patented Oct. 24, 1911.
7 SHEETS—SHEET 6.

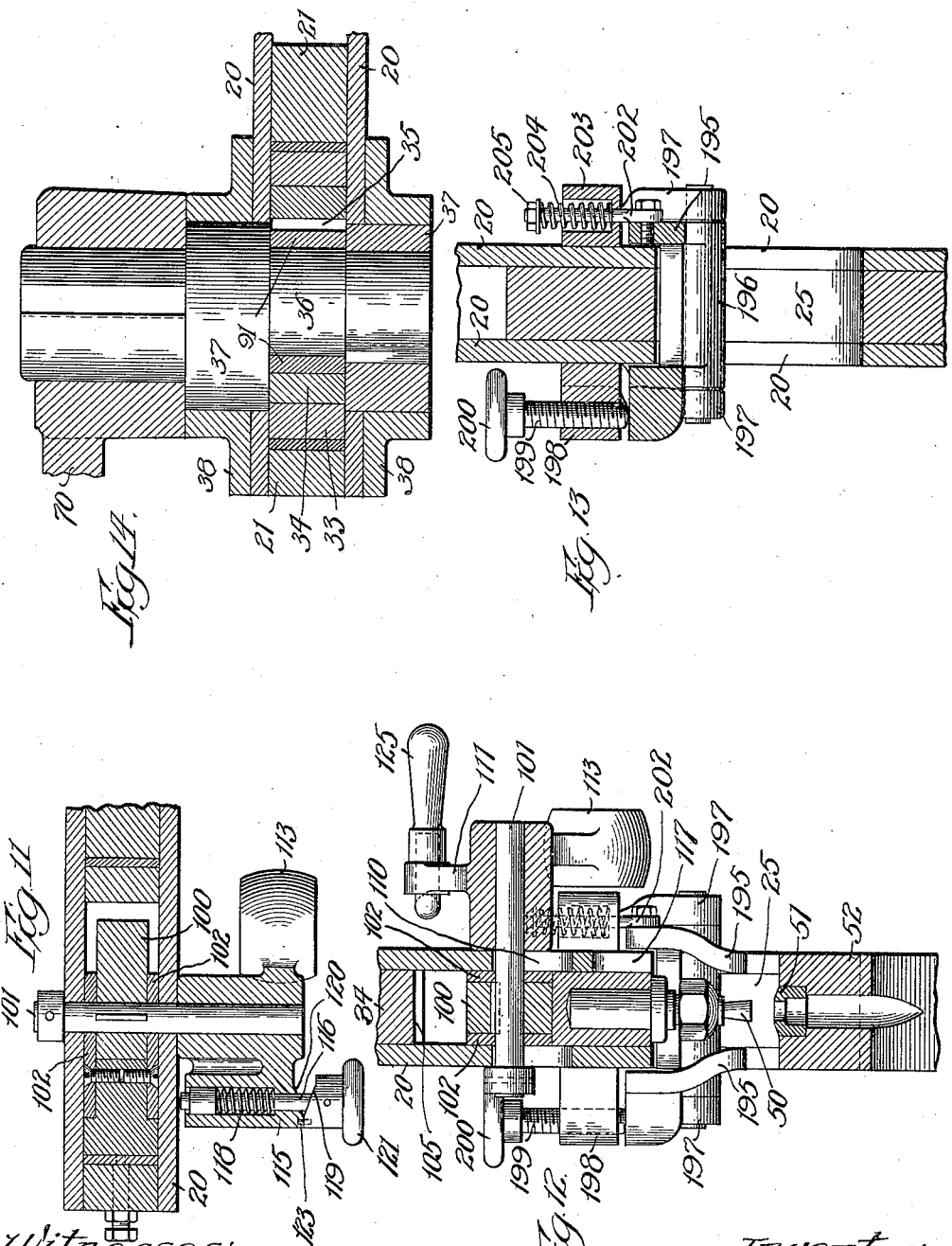

UNITED STATES PATENT OFFICE.

HANS B. KRAUT, OF CHICAGO, ILLINOIS, ASSIGNOR TO JOSEPH T. RYERSON & SON, OF CHICAGO, ILLINOIS, A CORPORATION OF ILLINOIS.

COMBINED PUNCHING, SHEARING, AND BAR-CUTTING MACHINE.

1,006,761.  Specification of Letters Patent.  Patented Oct. 24, 1911.

Application filed June 8, 1910. Serial No. 565,672.

*To all whom it may concern:*

Be it known that I, HANS B. KRAUT, a citizen of the United States, and a resident of Chicago, in the county of Cook and State of Illinois, have invented certain new and useful Improvements in Combined Punching, Shearing, and Bar-Cutting Machines; and I do hereby declare that the following is a full, clear, and exact description thereof, reference being had to the accompanying drawings, and to the letters of reference marked thereon, which form a part of this specification.

This invention relates to improvements in combined punching, shearing and bar-cutting machines of that class in which a punching mechanism, a shearing mechanism and a bar cutter mechanism are mounted on a single supporting frame and are operated from a single source of power, and the invention relates further to improvements in the different operating mechanisms of the machine.

The invention consists in the matters hereinafter set forth and more particularly pointed out in the appended claims.

In the drawings, Figure 1 is a side elevation of a machine embodying my invention, the right hand side thereof as viewed from the punching end. Fig. 2 is an elevation of the reverse side of the machine. Fig. 3 is an end elevation of the punching end of the machine. Fig. 4 is an end elevation of the shearing end of the machine. Fig. 5 is an enlarged vertical section of the punching end of the machine. Fig. 6 is an enlarged vertical section of the shearing end of the machine. Fig. 7 is an enlarged vertical section of the bar cutting mechanism. Figs. 8 and 9 are side elevations illustrating, respectively, the coöperating shears carried by the bar cutter sliding head and the door. Fig. 10 is a detail horizontal section on the line 10—10 of Fig. 1. Fig. 11 is a detail horizontal section on the line 11—11 of Fig. 1. Fig. 12 is a fragmentary detail vertical section on the line 12—12 of Fig. 1. Fig. 13 is a detail vertical section on line 13—13 of Fig. 1. Fig. 14 is a sectional view on the line 14—14 of Fig. 1. Fig. 15 is a front face view of the bar cutter door. Fig. 16 is a fragmentary section on the line 16—16 of Fig. 6. Fig. 17 is a plan view of the punch stripper. Fig. 18 is a sectional detail on line 18—18 of Fig. 6.

The frame of the machine as herein shown consists principally of side plates 20, 20 and a plurality of interposed filler pieces or bars 21, 21 which are riveted between the plates to constitute a rigid structure. Certain of said filler pieces are arranged to constitute guides for the movable mechanisms of the machine, and others to especially reinforce the frame at points where great stresses are imposed in the operation of the machine. At the front and rear ends of the machine are arranged transverse brace plates or webs 22, 22 which are bolted to the frame and to base bars 23 arranged transversely across the ends of the frame.

The side plates are cut away at the punching and shearing ends thereof to provide throat openings 25, 26, respectively, to receive material which is being operated upon, and is provided midway between its ends with a transverse opening 27 at which is located the bar cutting mechanism and through which opening the bars or rods may be inserted for action thereon by the shear blades.

At the punch end of the machine, and between the side plates 20, 20, is located a vertically sliding punch head or carriage 30, comprising upper and lower transverse members 31, 32, respectively, and side members 33, 33. Sliding vertically in the oblong opening in said head is an actuating slide 34 which is vertically shorter than said opening and has guiding engagement at its side margins with the side members of the sliding head or carriage. Said slide is provided with a bearing opening 35 to receive the eccentric or crank portion 36 of an operating rock shaft 37 that is mounted in bearings 38 fixed to the side plates of the frame. At the shearing end of the machine is located a similar sliding head or carriage 40, comprising upper and lower transverse members 41, 42, respectively, and side members 43, 43. Within the opening of said sliding head reciprocates a vertically movable actuating slide 44, made vertically shorter than said head opening. The said slide 44 is provided with a bearing opening 45 to receive the eccentric portion 46 of an operating rock shaft 47 that is mounted in suitable bearings 48, 48 carried by the side plates of the machine frame.

The carriage or head 30 carries a punch 50 which is fixed in any suitable manner to the lower transverse member 32 of the head, and coöperates with a die 51 that is mounted on a die support or bolster 52 which may be attached to the machine frame in the manner shown in Figs. 1 and 2. As shown in said figures, the bolster has a downwardly extending arm 53 that fits against and is bolted to the front end of the machine frame, and a rearwardly extending horizontal arm 54 that extends inwardly into the throat 25 and is bolted to the lower side of the throat piece by a bolt 55. Said rearwardly extending arm 54 is provided with an undercut tooth or flange 56 which engages the correspondingly shaped bottom of the socket formed in the throat piece to receive the same, as shown in Figs. 1 and 2, thereby relieving the fastening bolt 55 against shearing stress when operating pressure is brought to bear against the bolster, tending to pull the bolster forwardly. The carriage or head 40 at the shearing end of the machine carries the upper shearing blade 57, which is bolted or otherwise fixed to the lower transverse member of the head and coöperates with a lower stationary shear blade 58 that is fixed to the frame at the lower side of throat 26. Intermediate the punch and shear sliding heads or carriages, and guided between the side plates 20, is a third sliding head or carriage 60, comprising upper and lower transverse members 61 and 62, respectively, and side members 63, forming an open frame in which reciprocates an actuating slide 64 that is provided with a bearing opening 65 through which extends the eccentric or crank portion 66 of a rotative operating shaft 67 that is rotatively mounted at its ends in bearing members 68, 68 carried by the side plates of the machine frame. Said central sliding head or carriage carries one set of the blades of the bar cutter, as will hereinafter more fully appear. The said carriages or sliding heads are guided between certain of the filler pieces or bars 21 which constitute parts of the frame and are properly arranged to constitute guides as indicated in Figs. 5, 6 and 7. Desirably the guide bars will be provided at their guiding sides with hard metal facing plates, as best shown in Figs. 5, 6 and 7, to take the wear of said sliding heads.

The rocking operating shafts 37, 47 are provided with crank arms 70, 71, respectively, through which power is transmitted to said rock shafts and to reciprocate the actuating slides 34, 44 of the sliding heads. Said crank or rocking arms 70, 71 are actuated by means of links 72, 73 which are loosely connected at their outer ends with the outer ends of said crank arms and pivotally connected at their adjacent or inner ends to a stud 75 carried by a large gear wheel 76 that is fixed to one end of the central rotative operating shaft 67 associated with the bar cutting mechanism. The said gear wheel 76 is geared to and is rotated by an electric motor 78 mounted on a suitable bracket 79 carried by the upper side of the frame. The driving connection between said motor and gear wheel 76 embraces a pinion 81 on the motor shaft which meshes with a gear wheel 82 fixed to one end of a horizontal shaft 83 rotatively mounted in said bracket 79, and the other end of said shaft carrying a balance wheel 85. Said shaft also carries just inside the gear wheel 82 a pinion 86 which meshes with a large gear wheel 87 that is fixed to one end of a horizontal shaft 88 which extends through the frame and is rotatively mounted in bearings carried thereby. To the other end of said shaft 88 is fixed a pinion 90 that meshes with the large gear wheel 76. Through the gear connections described the two rock shafts 37 and 47 and the rotative shaft 67 are operated, the shafts 37 and 47 being rocked in their bearings and the shaft 67 being continuously rotated in one direction. The openings 35, 45 and 65 of the actuating slides 34, 44 and 64 associated with the punch, shear and bar cutter operating carriages or heads, are elongated as clearly indicated in Figs. 5, 6 and 7, to avoid side thrust of the eccentrics on said slides and sliding heads and their guide bearings. The crank or eccentric portions of said operating shafts are provided with hard metal wearing rings 91 which engage the walls of the bearing apertures in the actuating slides and thus avoid direct wear of the slides on the eccentric portions of the operating shafts during the severe pressure transmitting periods of the operation of the shafts, and also avoids the necessity of hardening the entire shaft. The openings in said sliding heads or carriages are made of greater vertical length than the actuating slides so that said slides may normally reciprocate in said heads, through the action of the eccentrics or cranks of the operating shafts, without imparting motion to the heads. Means are provided which are operated at will to interpose a connecting element between said slides and heads in such manner that when the said slides are depressed motion is transmitted therefrom through said interposed elements to effect the operating strokes of the heads and the tool or tools carried thereby. One of the features of my invention resides in the provision of a novel means for thus effecting a connection between the slides and heads arranged to operate the heads at will or to operate them continuously, as desired, and one practical form or embodiment thereof will now be described. The connecting means associated with each sliding head and its actuating slide are essentially similar to those associated with the other heads and actuating slides, and a description of the essential features of one will answer for the others, the same reference numerals indicating like parts.

100 designates an elongated dog or filler block which is arranged between the upper face of the lower transverse member of the carriage or head and the lower face of the carriage actuating slide. The said filler block, in the construction shown, has a rocking movement about the axis of a horizontal shaft 101, and is so arranged that when lying in a horizontal position (its normal inoperative position) it will be wholly below the lowest position of movement of the actuating slide, but when raised to a vertical position, as indicated in dotted lines in Fig. 5, will be engaged by the actuating slide, when the latter moves downwardly, to constitute a compression connecting element through which the motion or power stroke of the actuating slide is transmitted to the carriage or head and the tool carried thereby. The said rock shaft 101 may be mounted to rock in laterally separated plates 102, 102 that lie one on each side of the filler block and are bolted to lugs 103, 103 made integral with the sliding carriage or head and located in the angle between one side member and the lower transverse member of the carriage or head. The pivoted end of the dog is curved concentrically to the axis of the shaft 101 and engages, when in its vertical position, a curved seat 104 on the upper face of the transverse member of the carriage. The dog is likewise curved at its outer or free end to engage a curved seat or notch 105 formed on the lower end face of the actuating slide. Thus, when the filler block is swung into its vertical or connecting position and is engaged with the seat 105 of the eccentric actuated slide, there will be such an interlocking connection between the filler block and actuating slide as to prevent accidental displacement of the filler block. The lug 103 is likewise curved on its inner face to engage the curved end of the filler block when the latter occupies its horizontal or inoperative position, and said lug is formed at the inner side of its upper end to provide a stop 107 which limits the movement of the filler block when swung upwardly to properly engage the actuating slide.

The ends of the filler block shaft 101 extend outwardly into vertical slots 110 formed in the side plates of the machine frame, and one end of said shaft 101, at one side of the machine, is provided with a crank arm 111 to which may be connected in any suitable manner an actuating mechanism, operated by either foot or hand power, by which to operate the filler block or element to swing it into its operative position. The detail of the rock shaft 101, its crank arm and the parts associated therewith are more clearly shown in Fig. 11. Said crank arm may be formed on a hub 112 that is provided with a counterweighted arm 113 by which the filler block is automatically returned to inoperative position when the force by which it is swung into its operative position has been released. Each crank arm 111, or the hub of which it constitutes a part, may also be provided with a locking arm 115 which carries an endwise reciprocating, spring-pressed locking bolt 116 which is adapted to engage an elongated locking notch 117 in the adjacent side plate of the frame. The said bolt is arranged to engage the said locking notch 117 when the rock shaft is rotated to swing the filler block into its vertical or operative position in which it constitutes a connection between the eccentric actuated slide and the sliding head or carriage, and the notch 117 is made of such length as to permit the required movement of the locking bolt with the sliding head when the latter reciprocates relatively to said frame. The filler block or connecting element is locked in this position when it is desired to continuously reciprocate the carriage and the tool carried thereby. When the tool is to be operated intermittently or at will the locking bolt is released so that said filler block may be actuated under the control of its counterweight. The said locking bolt 116 slides endwise in an opening in the locking arm 115 and is adapted to be projected from the inner side of said arm for engagement with the notch 117 through the action of a spiral expansion spring 118 in the manner shown in Fig. 11. The bolt may be retracted away from the notch through the action of cam surfaces 119 and 120 on the arm and the hub of a hand wheel 121 that is fixed to the outer end of the bolt, said bolt being rotative and being retracted by turning said hand wheel in one direction to bring the high parts of the cam surfaces in engagement with each other, as shown in said Fig. 11. When the locking bolt is rotated in the other direction the spring 118 forces it inwardly from the locking arm for engagement with the notch 117. In order to prevent the locking bolt 116 from accidentally turning to release it from its retracted position, a locking pin 123 is carried by the hub of the hand wheel to engage a socket or notch in the outer face of the locking arm, as shown in Fig. 11.

The filler blocks or dogs associated with the punching, shearing and bar cutting mechanism all operate in the same manner to transmit motion from the continuously reciprocating or movable eccentric actuated slide, to the sliding tool head or carriage when said filler block or analogous element is properly interposed between the constantly movable and intermittently movable parts, the arrangement being such that when either one of said filler blocks is moved into operative position, the associated tool carriage or sliding head will be operated to depress the tool carried thereby, and that when said filler block or connecting element is in its inoperative position, the reciprocation of the actuating slide will have no effect on said sliding head or carriage to operate the same. Other suitable means may be employed for thus connecting the eccentric actuated slides with the sliding heads, and such connecting means may be operated in any convenient manner and may transmit power to the sliding heads either as compression elements or tension elements, depending upon the particular arrangement thereof relatively to the sides and heads. The rock shafts upon which said filler blocks are mounted may be rocked by hand to interpose the filler blocks or connecting elements into position to transmit motion from the actuating slides to the sliding heads by hand, and a hand piece 125 is shown as associated with the crank arm 111 of the cutter bar and punch mechanism, whereby the filler block may be thus actuated by hand. Moreover any one of the crank arms may be thus actuated by hand through the medium of the hand wheel 121 of the locking lever when the locking bolt thereof is retracted.

I have herein shown the crank arms 111 of the filler block shafts associated with the punching and shearing mechanism as adapted to be operated by foot power through the medium of foot levers 127, 128 located at the punch and shearing ends, respectively, of the machine. The connection between the filler block and the foot lever 128 at the shearing end of the machine, which lever is pivoted to the machine frame at 129, comprises a link 130 that is pivoted at its lower end to the inner end of the foot lever 128 and at its upper end to one arm of a bell crank lever 131 that is pivoted to the machine frame, and the other arm of which is connected by means of a link 132 with the crank arm 111 of the filler block actuating shaft of the shearing mechanism.

The foot lever 127 at the punching end of the machine is pivoted to the machine frame at 135, and is connected at its inner end by means of a link 136 with an arm 137 fixed to one end of a rock shaft 138 that extends transversely through and has bearing in the machine frame. Fixed to the other end of said rock shaft 138 is an arm 139 which is connected by means of link 140 with one arm of a bell crank lever 141 that is pivoted to the machine frame, the other arm of said bell crank lever being connected by a link 142 with the crank arm 111 of the filler block actuating shaft of the punching mechanism.

The introduction of the rock shaft 138, which extends transversely through the machine frame, between the links 136 and 140, serves to offset the link connection between the punching mechanism foot lever and the filler block operating shaft of said punching mechanism so that it will not interfere with the strip which advances over the guide or way 145 at the right hand side of the machine as it is sheared from a bar or plate, as will be apparent from inspection of Figs. 1 and 3. Furthermore said link connection between foot lever 127 and the filler block of the punching mechanism does not interfere with the forward passage of the main body of the plate or bar over the downwardly inclined way 146 at the left hand side of the machine during a shearing operation.

The sliding carriages 31, 40 and 60 of the punching, shearing and bar cutter mechanisms, respectively, are counterbalanced or suspended by means of springs or equivalent devices, against the action of which said sliding heads are depressed, and the counterbalancing devices operate to raise the heads and the tools carried thereby, when relieved from the depressing influence of the eccentric actuated slides, to withdraw or strip the tools from the material being operated upon. The counterbalancing device in each instance comprises a spiral, expansively acting spring 150 which is supported at its lower end on a saddle 151 rigid with the frame and surrounds a stem 152 that is fixed at its lower end to the sliding head and extends upwardly through and slides in an opening in said saddle. The spring is interposed between the saddle and a shoulder 153 fixed in any suitable manner to the upper end of said stem.

The opening in the sliding head of the punching mechanism, in which the eccentric actuated slide thereof reciprocates, is made of such length that the said head may be depressed, when the slide is in its uppermost position, for the purpose of centering the punch, as clearly shown in Fig. 5, there being at this time a space between the upper side of said slide and the upper transverse member of the sliding head. The said sliding head may be preliminarily depressed, for the purpose of centering the tool through the action of a rack and pinion mechanism. It comprises in this instance a pinion 155 fixed to a horizontal, rotative shaft 156 that extends transversely through and has bearing in the machine frame, and a rack 157 formed on the inner side of the sliding head with which said pinion meshes. The said pinion shaft 156 may be rotated through the medium of a hand wheel 159 that is mounted on one end of said shaft 156, at the right hand side of the machine as herein shown. This hand wheel may be normally disconnected from the shaft and adapted to be interlocked thereto when the shaft is to be turned or rotated in the same manner as the hand wheel, for a like purpose, is connected with the punch centering pinion shaft shown in my prior application for Letters Patent, Serial Number 516,010 filed on the 3rd day of September, 1909. The pinion shaft may also be rotated by foot power, as shown in said latter application.

The shear blades which are associated with and are operated by the bar cutter sliding head 60, are arranged in two sets, one set being carried by the sliding head and the other set being carried by a swinging door 165 that swings toward and away from said opening or throat 27. The said door is hinged to a vertical pintle 166 located at one side the bar cutter opening or throat 27 that extends through lugs 167, 167 on the door and a fixed lug 168 attached to the frame at one side of said bar cutter opening or throat and is adapted to be locked in its closed position by means of screw studs 169 extending through the swinging end of the door and into the frame. The blades herein shown are arranged to cut L and T shaped bars, as well as round and square bars. The bar cutter sliding head is recessed at its lower end, as shown at 170, Fig. 7, to receive a set of movable shear blades, designated as a whole in Fig. 10 by 171, said blades having their outer or front faces flush with the front face of said sliding head 60. The stationary shear blades, designated as a whole by 172 in said Fig. 10, are in a like manner fixed in a recess in the rear side of the door 165, with their rear faces flush with the rear face of said door, and said stationary and movable blades coöperate with each other with a shearing engagement.

The blades carried by the cutter bar sliding head 60 are shown in Fig. 8 and consist as herein shown of four parts or members $a$, $a'$, $a^2$ and $a^3$, the blade $a$ having converging cutting edges $a^4$, and the other blades being provided with round and square openings $a^5$, $a^6$, $a^7$ and $a^8$ having shearing edges. There is provided between the lower cutting edges of the blade $a$ and the upper edge of the blade $a^2$ and a filler piece $a^9$, which latter edges are shown as generally parallel with shearing edges of the blade $a$, an L-shaped clearance opening $a^{10}$ which is in line with a like-shaped clearance opening $c$ of the sliding head. Said clearance opening $a^{10}$ is provided at its lower side with an extension $a^{11}$ formed between the filler piece $a^9$ and the blade $a^2$ to receive the lower flange of a T-bar and the clearance opening $c$ of the sliding head is provided in line therewith with a like extension $c'$ to receive the lower flange of a T-bar. The sliding head is also provided with round and square clearance openings $c^2$, $c^3$, $c^4$, $c^5$ which register with the openings in the blades carried by said head.

The cutting edges $a^4$, $a^4$ of the blade $a$ are adapted to coöperate with the cutting edges $b$, $b'$ of blades $b^2$, $b^3$ of the set 172 carried by the door, said cutting edges $b$, $b'$ being disposed at an angle of ninety degrees with respect to each other and arranged below and generally parallel with the cutting edges of said blade $a$. The said blade $a$ is provided with two pairs of converging cutting edges, giving to the blade a generally rectangular shape, and the blade is arranged to be reversed to present either pair of cutting edges to the work and thus prolong its life. In addition to the blades $b^2$, $b^3$, the set of blades 172 comprises also two other blades $b^4$, $b^5$, and the blade $b^3$ and blades $b^4$, $b^5$ are provided with round and square openings $b^6$, $b^7$, $b^8$, $b^9$ having shearing edges which coöperate with those of the openings $a^5$, $a^6$, $a^7$, $a^8$ of the sliding head blades; the shearing openings of the two sets of blades being in register when the cutter bar sliding head occupies its uppermost position. The door is provided in line with the registering openings of the shearing blades and the sliding head with clearance openings $d$, $d'$, $d^2$, $d^3$ through which the round and square bars are inserted into the shearing blade openings. Said door is also provided in line with the L-shaped clearance opening $c$ of the cutter bar sliding head and in line with the L-shaped space between the upper and lower cutter blades $a$ and $b^2$, $b^3$, respectively, with a triangular shaped opening $d^4$ through which an L-bar may be inserted between the upper and lower L-bar shearing blades; and said opening $d^4$ is provided at its lower side with an extension $d^5$ to receive the lower flange of a T-bar.

The blade $b^2$ carried by the door is longitudinally adjustable on the blade $b^5$ toward and from the shearing edge of the blade $b^3$ so that it may be adjusted with its lower end against the cutting edge of the blade $b^3$, or may be withdrawn therefrom to provide an opening $b^{10}$ in line with the extension openings $a^{11}$, $c'$ and $d^5$ of the movable set of shearing blades, the sliding head and the door, respectively, to receive the lower flange of a T-bar. Provision is made for such adjustment of the blade $b^2$ by elongating the bolt holes $b^{11}$, $b^{11}$ through which extend the bolts that fasten the blade $b^2$ to the door. Thus it will be seen that by a simple adjustment of the blade $b^2$, the cutter bar mechanism may be arranged to cut either an L-bar or a T-bar.

Located outside of and supported on the door and having vertical guiding engagement therewith, is a bearer plate 178, said plate having guiding engagement at its lateral margins with vertical guide grooves 179, 179 in said door. (Fig. 10.) The bearer plate is provided in line with the openings of the slide, the shearing blades and the door with openings $e$, $e'$, $e^2$, $e^3$, $e^4$. The opening $e$ is of general triangular shape to receive an L-bar or a T-bar, and is provided at its lower side with an extension $e^5$ to receive the lower flange or T-bar. The other openings $e'$, $e^2$, $e^3$ and $e^4$ are round and square and are located, respectively, in line with the round and square openings of the shear blades and the clearance openings of the sliding head and door, thereby providing through openings through the bearer plate, the door and the sliding head. The said bearer plate is provided in the opening $e$ with a downwardly extending projection $e^6$ that is adapted to engage an angle or T-bar at the inner angle of the same when the bearer plate is depressed.

The purpose of the vertically adjustable bearer plate, carried by the door as described, is to press or bear downwardly bars of different thicknesses and diameters against the lower supporting surfaces afforded by the lower sides of the bar openings in the door, so as to hold the outer end of a bar from rising while it is being cut by the shearer blades, thereby insuring that the cut will be directly through the bar to produce a clean, square cut.

The means which I have shown for adjusting the bearer plate for this purpose, are made as follows: The bearer plate is provided at its lateral sides, and on its outer face, with racks 180 with which mesh pinions 181 that are fixed to a horizontal rotative shaft 182 which is mounted in bearing lugs 183, 183 formed integral with and project forwardly from the door. Said pinion shaft is provided at one end with a fixed worm wheel 184 which meshes with a worm wheel 185 fixed to a worm shaft 186 that is mounted in a suitable bearing 187 carried by or made integral with the door. The said worm shaft is provided at its outer end with a hand wheel 188 by which it may be rotated. The construction described provides means for vertically adjusting the bearer plate and for automatically locking the bearer plate in any adjusted position. In order that L-bars may be miter cut or sheared, the rear side of the sliding cutter bar head is inclined or cut away as shown at 189, in full lines in Fig. 2 and in dotted lines in Fig. 7. The recessed or cut away portion of the slide makes it possible to elevate the outer end of a bar so as to present it in an oblique angle to the shearing blades, and thus produce a miter cut on the bar. As a further and separate improvement, I have provided a notching mechanism which may be associated with either the punching or shearing sliding head, for cutting notches in the edges of bars or plates. As herein shown said notching mechanism is located at the shearing end of the machine, and comprises a reciprocating blade 190, which may be made integral with or fixed in any suitable manner to the sliding head 40 of the shearing mechanism, and a stationary U-shaped blade 191 fixed to the upper side of a bracket 192 that is rigidly fixed in any suitable manner to the machine frame. Said bracket is provided with a clearance opening 193 through which the material cut from the bars or plates is discharged. The upper blade carried by the sliding head is shown in Fig. 6 in its upper position with the upper and lower notching blades separated to receive a plate or bar between them and when said sliding head is depressed the upper notching blade 190 is moved down into the lower U-shaped blade to notch a plate placed between the same.

I have provided at the punching end of the machine a novel stripping device which is arranged to afford a maximum clearance in the throat 25, the adjusting means for the stripping device being for this purpose located outside of the throat. The stripper 194 comprises two arms 195, 195 arranged at their free ends one at each side of the punch and made integral at their rear end with a bearing sleeve or hub 196 that is pivotally mounted on the downwardly extending arms of brackets 197, 197 bolted or otherwise rigidly secured to the frame at each side of the throat plate. The bracket 197 at one side of the machine frame is formed at its outer end with a screw-threaded sleeve 198 which receives an adjusting screw 199 that bears at its lower end against the upper side of one of the arms of the stripper and is provided at its upper end with a hand wheel 200 by which it is rotated to adjust the stripper. Pivoted to the other arm of the stripper is an eye-bolt 202 which extends upwardly through a hollow enlargement 203 of the adjacent bracket 198, and a spring 204, contained within said hollow enlargement and interposed between a shoulder at the lower end thereof and a head 205 at the upper end of the eye-bolt, serves to normally hold the stripper in its uppermost position. It will be seen that the adjusting device for the stripper is located at the side of and wholly away from, the throat and in no way interferes with the material which is inserted into the throat.

The stripper 207 at the shearing end of the machine is pivoted to a stud 208 fixed in any suitable manner to the machine frame, and is adjusted toward and from the material by means of a screw-thread adjusting spindle 209 that is rotatively mounted in a lug 210 on the side of the machine frame and has screw threaded engagement at its lower end with the inner or rear end of said stripper 207.

I claim as my invention:

1. The combination with a frame, a sliding tool carrying head therein and an actuating slide having guiding engagement in and reciprocable relatively to said head, of a filler block having means for moving it into and out of operative position and arranged, when in operative position, to transmit the power stroke of the slide to the head and a locking bolt adapted to engage an opening in the frame for locking the filler block in operative position for continuous operation.

2. The combination with a frame, a sliding tool carrying head therein and an actuating slide reciprocable relatively to the head, of a filler block carried by the slide, a rock shaft on which said filler block is mounted, and extending at its end into an elongated opening in the frame and means connected with the end of the rock shaft for rocking the filler block into operative position for transmitting the power stroke of the slide to the tool carrying head.

3. The combination with a frame, a sliding tool carrying head therein and an actuating slide reciprocable relatively to the head, of a filler block carried by the slide, a rock shaft on which said filler block is mounted and extending at its end into an elongated opening in the frame, means connected with the rock shaft for rocking the filler block into operative position for transmitting the power stroke of the slide to the tool carrying head, an arm on said rock shaft and a spring pressed locking bolt slidable in the arm and adapted to engage an elongated notch in the frame for locking the filler block in operative position for continuous operation of the tool carrying head.

4. The combination with a frame, a sliding tool carrying head therein and an actuating slide reciprocable relatively to the head, of a filler block carried by the slide, a rock shaft on which said filler block is mounted and extending at its end into an elongated opening in the frame, means connected with the rock shaft for rocking the filler block into operative position for transmitting the power stroke of the slide to the tool carrying head, an arm fixed to said rock shaft, a spring pressed, endwise movable bolt carried by the arm and adapted to engage an elongated notch in the frame to lock the filler block in operative position and a cam device for retracting said locking bolt and holding it in its retracted position.

5. The combination with a frame, a sliding tool carrying head therein and an actuating slide reciprocable relatively to the head, of a filler block carried by the slide, a rock shaft on which said filler block is mounted and extending at its ends into an elongated opening in the frame, means connected with the rock shaft for rocking the filler block into operative position for transmitting the power stroke of the slide to the tool carrying head, an arm fixed to said rock shaft, a spring pressed, endwise movable bolt carried by the arm and adapted to engage an elongated notch in the frame to lock the filler block in operative position, and a head on the outer end of the bolt provided with a cam surface, the arm carrying the bolt being provided with a complemental cam surface adapted to be engaged by the cam surface on said head, whereby when the locking bolt is rotated on its axis the locked bolt is retracted from its locking position.

6. The combination with a frame, a sliding tool carrying head therein and an actuating slide reciprocable relatively to the head, of a filler block carried by the slide, a rock shaft on which said filler block is mounted and extending at its end into an elongated opening in the frame, means connected with the rock shaft for rocking the filler block into operative position for transmitting the power stroke of the slide to the tool carrying head, an arm fixed to said rock shaft, a spring pressed, endwise movable bolt carried by the arm and adapted to engage an elongated notch in the frame to lock the filler block in operative position, a head on the outer end of the bolt provided with a cam surface, the arm carrying the bolt being provided with a complemental cam surface adapted to be engaged by the cam surface on said head, whereby when the locking bolt is rotated on its axis the locked bolt is retracted from its locking position, and a pin carried by the cam portion of said head piece and adapted to engage a socket or notch in the cam portion of said arm to lock the bolt in its retracted position.

7. The combination with a frame, a sliding tool carrying head therein and a reciprocable actuating slide having guiding engagement in the head, of a filler block through which the power stroke of the slide is transmitted to the head, a shaft on which said filler block is mounted, the said shaft being pivotally mounted on parts carried by the head, the shaft extending at its ends through elongated slots in the frame and provided at one end with means for rocking it, and a stop carried by the head for limiting the upward movement of the filler block when swung into operative position.

8. The combination with a frame, a sliding tool carrying head therein provided with a central opening and an actuating slide having guiding engagement with and reciprocable in said opening, of a vertical swinging filler block, a shaft to which said filler block is fixed, said head being provided with two plates between which the filler block is mounted, said plates having bearing openings for the filler block shaft, and the ends of said shaft extending into elongated openings in the frame, one end of said shaft being provided with means for rocking it to swing the filler block into and out of operative position.

9. The combination with a frame, a sliding tool carrying head therein and an actuating slide reciprocable relatively to the head, of a swinging filler block pivoted to and carried by said head and adapted to be swung into operative position to transmit the power stroke of the slide to said head, a foot lever, and operative connections between said foot lever and filler block.

10. The combination with a frame, a sliding tool carrying head therein and an actuating slide reciprocable relatively to the head, of a swinging filler block pivoted to and carried by said head and adapted to be swung into operative position to transmit the power stroke of the slide to said head, a foot lever, operative connections between said foot lever and filler block, and means acting in opposition to the foot lever to return the filler block to its inoperative position.

11. The combination with a frame, a sliding tool carrying head mounted therein, an actuating slide reciprocating relatively to the head and an operating shaft mounted in the frame and having an eccentric which actuates said slide, of a filler block movable into operative position between the slide and head, and means for actuating the filler block.

12. The combination with a frame, a sliding tool carrying head mounted therein, an actuating slide reciprocable relatively to the head and an operating shaft mounted in the frame and having an eccentric which actuates said slide, of a filler block movable into operative position between the slide and head, means for actuating the filler block, and a counter-balancing device acting on the head in opposition to the action of the actuating slide.

13. The combination with a frame, a sliding tool carrying head mounted therein, an actuating slide reciprocable relatively to the head and an operating shaft mounted in the frame and having an eccentric which actuates said slide, of a filler block movable into operative position between the slide and head, means for actuating the filler block, and a counter-balancing device acting on the head in opposition to the action of the actuating slide, comprising a stem extending upwardly from the sliding head and a spring surrounding said stem and interposed between the frame and a shoulder or head at the outer end of said stem.

14. In a machine for the purpose described, the combination with a frame formed with a throat, and a sliding tool-carrying head mounted in the frame and carrying a tool which coöperates with a complemental tool at the lower side of the throat, of a stripper device pivotally mounted on the machine frame at the upper side of the throat and having adjusting means located laterally outside of and above the throat.

15. In a machine for the purpose described, the combination with a frame formed with a throat, and a sliding tool carrying head mounted in the frame and carrying a tool which coöperates with a complemental tool at the lower side of the throat, of a stripper device pivotally mounted on the machine frame at the upper side of the throat and having adjusting means located laterally outside of and above the throat and a spring connecting the stripper and frame and against the action of which said adjusting means acts.

16. In a punching machine, the combination with a frame provided with a throat, a sliding tool carrying head mounted in the frame, a punch carried by said head and a die fixed to the frame at the lower side of the throat, of a stripper comprising two arms arranged with their free or forward ends one at each side of the punch and pivoted at their rear ends to a bracket fixed to the frame above the throat and means located laterally outside of and above the throat for adjusting said stripper toward and from the work.

17. The combination with a frame provided with a throat, a sliding tool carrying head mounted in the frame and carrying a tool, and a complemental tool fixed to the frame at the lower side of the throat, of a stripper comprising two arms arranged with their free or forward ends one at each side of the upper tool and pivoted at their rear ends to a bracket fixed to the frame above the throat, a screw-threaded stem carried by the frame laterally outside the throat and adapted to bear against one of the stripper arms for adjusting the stripper toward the work and a spring connecting between the other stripper arm and the machine frame and acting in opposition to the screw-threaded adjusting stem.

18. In a punching machine, the combination with a machine frame provided with a throat, of a bolster at the front end of the throat provided with means for supporting a die, said bolster being provided with an arm extending laterally into the throat and having an under cut lip adapted to engage a complemental lip in the frame at the lower side of the throat and a bolt extending through said arm and into the frame.

19. In a punching machine, the combination with a machine frame provided with a throat, of a bolster at the front end of the throat provided with means for supporting a die, said bolster being provided with a vertical arm fitted to the front side of the frame and attached thereto, an arm extending laterally into the throat and having an under cut lip adapted to engage a complemental lip in the frame at the lower side of the throat and a bolt extending through said latter arm and into the frame.

20. The combination with a frame, of a sliding tool carrying head therein adapted to carry at its end a tool which coöperates with a complemental tool fixed to the frame, of a notching device comprising an extension carried by and extending laterally from said sliding head, a notching blade carried by said extension, a bracket fixed to the frame and a blade mounted on the bracket coöperating with the movable notching blade.

21. The combination with a frame, a sliding tool carrying head mounted thereon adapted to carry at its lower end a tool which coöperates with a complemental tool that is fixed to the frame, of a notching device comprising an extension integral with and extending outwardly from the sliding head, a notching blade carried by said extension, a bracket fixed to the frame beneath said extension and a blade fixed to the bracket and adapted to coöperate with the movable notching blade on said extension.

22. The combination with a fixed frame, a sliding tool carrying head therein which carries at its lower end a tool that coöperates with a tool fixed to the frame, of a notching device comprising an extension carried by and extending laterally from the sliding head, a notching blade carried by said extension, a hollow bracket fixed to the frame below said extension and a U-shaped blade carried by the hollow bracket adapted to coöperate with the movable blade of said extension.

23. In a combination punching and shearing machine, a frame, a punching mechanism at one end of the frame, a shearing mechanism at the other end of the frame, the frame being provided at its opposite sides with guide ways, forwardly over which the sheared plate passes from the shears, a controlling mechanism for the punching mechanism, and a foot operated mechanism for operating said controlled mechanism arranged in an offset relation to avoid contact with the metal on said ways.

24. In a combination punching and shearing machine, a frame, a punching mechanism at one end of the frame, a shearing mechanism at the other end of the frame, the frame being provided at its opposite sides with guide ways, forwardly over which the sheared plate passes from the shears, a controlling mechanism for the punching mechanism, a foot operated mechanism for operating said controlled mechanism comprising a foot lever, a rock shaft extending transversely through the machine frame between the guide ways and provided at one end with an arm which is operatively connected with the foot lever and at its other end with an arm which is operatively connected with said punch controlling mechanism.

25. In a combined punching and shearing machine, a frame, a punching mechanism at one end of the frame, a shearing mechanism at the other end of the frame, the frame being provided at its opposite sides with guide ways forwardly over which the sheared plate passes from the shears, a controlling mechanism for the punching mechanism, a rock shaft extending transversely through the machine frame between said ways and provided at its ends with arms, a foot lever at one side of the frame, a link connecting one of the rock shaft arms with the foot lever, a bell crank lever at the other side of the frame, a link connecting the other arm of the rock shaft with one arm of the bell crank lever and a link connecting the second arm of the bell crank lever with said controlling mechanism.

26. In a punching machine, a frame, a sliding head carrying a punch, operating means for said head, controlling means adapted to afford intermittent connection between the operating means and the head, a foot lever at the lower side of the machine, a shaft extending transversely through the machine frame and provided at one end with an arm which is connected with the foot lever and at its other end with an arm which is operatively connected with said controlling means.

27. In a machine for the purpose set forth, the combination with a frame provided with a transverse bar opening, a sliding bar cutter head mounted in said frame carrying a set of shear blades, and a set of coöperating shear blades carried by the frame, of a vertically adjustable bearer plate located outside the support for the stationary shear blades and adapted to support the bars against tilting when acted upon by the shear blades.

28. In a machine for the purpose set forth, the combination with a frame provided with a transverse bar opening, a sliding bar cutter head mounted in said frame carrying a set of shear blades, and a set of coöperating shear blades carried by the frame, of a vertically adjustable bearer plate located outside the support for the stationary shear blades and adapted to support the bars against tilting when acted upon by shearing blades, and means for adjusting the bearer plate arranged to lock it in its adjusted position.

29. In a machine for the purpose set forth, the combination with a frame provided with a transverse bar opening, a sliding bar cutter head mounted in said frame carrying a set of shear blades, and a set of coöperating shear blades carried by the frame, of a vertically adjustable bearer plate located outside the support for the stationary shear blades and adapted to support the bars against tilting when acted upon by shearing blades, and means for adjusting the bearer plate comprising a rack on the shearer plate, a pinion shaft having a pinion engaging the rack and provided with a worm and a rotative worm wheel engaging the worm for adjusting the pinion shaft and bearer plate and locking the parts in adjustable position.

30. In a machine for the purpose set forth, the combination with a frame provided with a transverse bar opening, a cutter bar sliding head carrying a set of bar shear blades, and a door hinged to said frame and carrying a set of bar shear blades coöperating with the movable shear blades, the door and slide being provided with registering openings to receive the bars to be cut by the shear blades, of a bearer plate guided upon the door and provided with bar openings registering with those of the door, and means carried by the door for adjusting the bearer plate and locking it in its adjusted position.

31. In a machine for the purpose set forth, the combination with a frame provided with a transverse bar opening, a sliding bar shearing head carrying a set of bar shear blades, and a door hinged to said frame and carrying a set of shear blades coöperating with the movable blades, the door and slide being provided with registering openings to receive the bars cut by the shears, of a bearer plate guided upon the door and provided with openings registering with those of the door, said bearer plate being provided with a rack, and a rotative shaft mounted on the door provided with a pinion engaging the rack and with a worm, and a worm wheel rotatively mounted on the door engaging the worm.

32. In a bar cutting machine, a frame provided with a bar opening, a sliding bar cutter head therein carrying a set of bar shear blades, a fixed set of shear blades carried by the frame with which the movable shear blades coöperate, the head being provided opposite the shear openings between the shear blades with a clearance opening, and the head being recessed on its side remote from the shear blades carried thereby to permit a bar to be canted or inclined for miter shearing.

33. In a machine for the purpose set forth, the combination with a frame provided with a transverse bar opening, a sliding bar shearing head carrying a set of bar shear blades and a door hinged to said frame and carrying a set of shear blades coöperating with the movable blades, the door and slide being provided with registering openings to receive the bars cut by the shears, of a bearer plate guided upon the door and provided with openings registering with those of the door, means for adjusting the bearer plate vertically on the door, the said slide being recessed on its side remote from the shear blades carried thereby to permit a bar inserted through the opening in the door and slide to be canted or inclined for miter shearing.

34. A combined punching and plate shearing and bar cutting machine comprising a frame, a punching mechanism at one end thereof, a plate shearing mechanism at the other end thereof, notching or coping blades at the latter end of the frame, the frame having between its ends a transverse opening for the passage of bars, a bar cutting mechanism located at said opening and a power driven shaft mounted in said frame and operatively connected with and driving said mechanisms.

In testimony, that I claim the foregoing as my invention I affix my signature in the presence of two witnesses, this 14th day of May A. D. 1910.

HANS B. KRAUT.

Witnesses:
WILLIAM L. HALL,
WILLIAM GOLDBERGER.

---

Copies of this patent may be obtained for five cents each, by addressing the "Commissioner of Patents, Washington, D. C."